(12) United States Patent
Sarsen et al.

(10) Patent No.: US 10,794,253 B2
(45) Date of Patent: Oct. 6, 2020

(54) ENGINE AND COOLANT SYSTEM CONTROL SYSTEMS AND METHODS

(71) Applicant: GM GLOBAL TECHNOLOGY OPERATIONS LLC, Detroit, MI (US)

(72) Inventors: Douglas C. Sarsen, Hartland, MI (US); Thomas LaRose, Jr., Howell, MI (US); Nicholas Girardi, Milford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 92 days.

(21) Appl. No.: 16/009,355

(22) Filed: Jun. 15, 2018

(65) Prior Publication Data
US 2019/0383187 A1    Dec. 19, 2019

(51) Int. Cl.
*F01N 3/20*     (2006.01)
*F02M 31/16*    (2006.01)
(Continued)

(52) U.S. Cl.
CPC ............ *F01N 3/208* (2013.01); *F02M 31/16* (2013.01); *F02M 31/205* (2013.01); *F02M 37/0052* (2013.01); *F01N 2610/02* (2013.01); *F01N 2900/1811* (2013.01); *F01N 2900/1821* (2013.01)

(58) Field of Classification Search
CPC ............ F01N 2610/11; F01N 3/2066; F01N 2610/02; F01N 2610/14; F01N 2260/024; F01N 2610/1433; F01N 5/02; F01N 11/002; F01N 2250/02; F01N 2610/1406; F01N 2610/1453; F01N 2610/146; F01N 2610/1473; F01N 2900/1811; F01N 2900/1821; F01N 3/035; F01N 3/04; F01N 3/106; F01N 3/2046; F01N 3/206; F01N 3/24; F01N 9/00; F01P 3/20; F01P 5/10; F01P 5/12; F01P 7/165; F01P 2060/10

See application file for complete search history.

(56) References Cited

U.S. PATENT DOCUMENTS

| | | | |
|---|---|---|---|
| 6,513,323 B1* | 2/2003 | Weigl | B01D 53/9431 60/286 |
| 2013/0118155 A1* | 5/2013 | Domon | F01N 3/10 60/274 |

(Continued)

OTHER PUBLICATIONS

U.S. Appl. No. 15/868,298.

*Primary Examiner* — Anthony Ayala Delgado (57) ABSTRACT

A coolant control system of a vehicle includes a coolant pump that pumps coolant to a second radiator that is different than a first radiator that receives coolant from an engine of the vehicle. A diesel exhaust fluid (DEF) injector injects a DEF into an exhaust system and receives coolant output from the second radiator. A fuel heat exchanger transfers heat between coolant and fuel flowing therethrough. An engine control module is configured to determine a temperature of the DEF injector, control a duty cycle of the coolant pump, determine a vaporized condition of the coolant based on a DEF injector temperature, optionally further, in response to determining a vaporized condition of the coolant, implement a vapor purge by oscillating the duty cycle of the coolant pump, and optionally further identify a low-coolant condition of the coolant control system based on the vapor purges implemented during a time period.

16 Claims, 5 Drawing Sheets

(51) Int. Cl.
*F02M 31/20* (2006.01)
*F02M 37/00* (2006.01)

(56) References Cited

U.S. PATENT DOCUMENTS

| | | | |
|---|---|---|---|
| 2014/0014204 A1* | 1/2014 | Wright | F16L 53/00 |
| | | | 137/594 |
| 2014/0322088 A1* | 10/2014 | Niaz | F01N 3/2066 |
| | | | 422/168 |
| 2019/0162107 A1* | 5/2019 | Schmitz | F01N 3/035 |

* cited by examiner

ENGINE AND COOLANT SYSTEM CONTROL SYSTEMS AND METHODS

INTRODUCTION

The present disclosure relates to internal combustion engines and more particularly to coolant and actuator control systems and methods.

An internal combustion engine combusts air and fuel within cylinders to generate drive torque. Combustion of air and fuel also generates heat and exhaust. Exhaust produced by an engine flows through an exhaust system before being expelled to atmosphere.

Excessive heating may shorten the lifetime of the engine, engine components, and/or other components of a vehicle. As such, vehicles that include an internal combustion engine typically include a radiator that is connected to coolant channels within the engine. Engine coolant circulates through the coolant channels and the radiator. The engine coolant absorbs heat from the engine and carries the heat to the radiator. The radiator transfers heat from the engine coolant to air passing the radiator. The cooled engine coolant exiting the radiator is circulated back to the engine to cool the engine.

SUMMARY

A coolant control system of a vehicle includes a coolant pump that pumps coolant to a second radiator that is different than a first radiator that receives coolant from an engine of the vehicle, a diesel exhaust fluid (DEF) injector that injects a DEF into an exhaust system of the vehicle and that receives coolant output from the second radiator, a fuel heat exchanger that receives fuel flowing from a fuel rail to a fuel tank of the vehicle, that receives coolant output from the DEF injector, and that transfers heat between coolant flowing through the fuel heat exchanger and fuel flowing through the fuel heat exchanger, wherein the coolant pump receives coolant output from the fuel heat exchanger, and an engine control module (ECM). The ECM is configured to determine a temperature of the DEF injector and determine a vaporized condition of the coolant based on a DEF injector temperature. The ECM is configured to determine a first temperature of the DEF injector, determine a second temperature of the DEF injector, determine an elapsed time between the determination of the first temperature of the DEF injector and the determination of the second temperature of the DEF injector, and determine a vaporized condition of the coolant if the first temperature of the DEF injector and the second temperature of the DEF injector each exceed a coolant vaporization temperature threshold and the elapsed time exceeds a coolant vaporization time threshold. The ECM can be configured to determine an average temperature of the DEF injector over a period of time at least as long as a coolant vaporization time threshold, and determine a vaporized condition of the coolant if the average temperature of the DEF injector exceeds a coolant vaporization temperature threshold. The ECM can be configured to determine a duty cycle of the coolant pump and control a duty cycle of the coolant pump based on the determined DEF injector temperature.

The ECM can be further configured to determine a duty cycle of the coolant pump and increase the coolant pump duty cycle in response to a determined DEF injector temperature above a coolant vaporization temperature threshold. A coolant control system of a vehicle can include a coolant pump that pumps coolant to a second radiator that is different than a first radiator that receives coolant from an engine of the vehicle, a diesel exhaust fluid (DEF) injector that injects a DEF into an exhaust system of the vehicle and that receives coolant output from the second radiator, a fuel heat exchanger that receives fuel flowing from a fuel rail to a fuel tank of the vehicle, that receives coolant output from the DEF injector, and that transfers heat between coolant flowing through the fuel heat exchanger and fuel flowing through the fuel heat exchanger, wherein the coolant pump receives coolant output from the fuel heat exchanger, and an engine control module (ECM). The ECM can be configured to determine a temperature of the DEF injector, control a duty cycle of the coolant pump, determine a vaporized condition of the coolant based on a DEF injector temperature, and in response to determining a vaporized condition of the coolant, oscillate the duty cycle of the coolant pump. Oscillating the duty cycle of the coolant pump can mitigate the vaporized condition of the coolant. Oscillating the duty cycle of the coolant pump can include oscillating between a maximum duty cycle and a minimum duty cycle of the coolant pump. Oscillating the duty cycle of the coolant pump can include oscillating between a relatively high duty cycle and a relatively low duty cycle of the coolant pump, and dwelling at each relatively high duty cycle and a relatively low duty cycle for a respective calibratable dwell time. Oscillating the duty cycle of the coolant pump can include oscillating between a relatively high duty cycle and a relatively low duty cycle of the coolant pump for a calibratable number of oscillating cycles. Oscillating the duty cycle of the coolant pump can include oscillating between a relatively high duty cycle and a relatively low duty cycle of the coolant pump at a calibratable frequency. The ECM can be further configured to, after oscillating the duty cycle of the coolant pump, determine a post-oscillating temperature of the DEF injector and assess a presence or absence of a vaporized condition of the coolant based on the post-oscillating temperature of the DEF injector.

A coolant control system of a vehicle can include a coolant pump that pumps coolant to a second radiator that is different than a first radiator that receives coolant from an engine of the vehicle, a diesel exhaust fluid (DEF) injector that injects a DEF into an exhaust system of the vehicle and that receives coolant output from the second radiator, a fuel heat exchanger that receives fuel flowing from a fuel rail to a fuel tank of the vehicle, that receives coolant output from the DEF injector, and that transfers heat between coolant flowing through the fuel heat exchanger and fuel flowing through the fuel heat exchanger, wherein the coolant pump receives coolant output from the fuel heat exchanger, and an engine control module (ECM). The ECM can be configured to determine a temperature of the DEF injector, control a duty cycle of the coolant pump, iteratively: determine a vaporized condition of the coolant based on a DEF injector temperature, and, in response to determining a vaporized condition of the coolant, implement a vapor purge by oscillating the duty cycle of the coolant pump, and identify a low-coolant condition of the coolant control system based on the vapor purges implemented during a time period. The ECM can be configured to identify a low-coolant condition of the coolant control system if a number of vapor purges implemented within the time period exceed a vapor purge count. The ECM can be configured to identify a low-coolant condition of the coolant control system if a collective duration of one or more vapor purges implemented within the time period exceeds a vapor purge duration threshold. The ECM can be further configured to engage a low-coolant alarm appurtenant to the vehicle in response to identifying a low-coolant condition of the coolant control system.

DETAILED DESCRIPTION

An engine combusts air and fuel to generate drive torque. For example, a diesel engine combusts air and diesel fuel within cylinders to generate drive torque. Combustion of air and fuel also generates heat and exhaust. Exhaust produced by the engine flows through an exhaust system before being expelled to atmosphere.

A diesel exhaust fluid (DEF) injector injects a DEF (e.g., urea) into the exhaust system to reduce the amount of one or more exhaust components (e.g., Nitrogen Oxides) before the exhaust is expelled to atmosphere.

A low pressure fuel pump pumps fuel from a fuel tank to a high pressure fuel pump. The high pressure fuel pump pumps fuel to a fuel rail. Fuel injectors inject fuel into cylinders of the engine from the fuel rail. A fuel regulator valve regulates fuel flow from the fuel rail back to the fuel tank. Fuel may also return to the fuel tank from the fuel injectors when insufficient power to open the fuel injectors is applied to the fuel injectors.

A coolant system circulates coolant through various components of the vehicle. For example, the coolant system includes a first coolant pump that pumps coolant through the engine, a radiator, and one or more other components, for example, to cool the engine and the one or more other components. The coolant system also includes a second coolant pump that pumps coolant through a heat exchanger, the DEF injector, and a fuel heat exchanger. Fuel flowing from the fuel rail back to the fuel tank (via opening of the fuel regulator valve) flows through the fuel heat exchanger on its way from the fuel rail to the fuel tank.

The heat exchanger transfers heat from coolant flowing through the heat exchanger to air passing the heat exchanger. Coolant flows from a coolant reservoir, through the heat exchanger to the DEF injector. Coolant flowing past/through the DEF injector draws heat from the DEF injector. The DEF injector is heated via the exhaust and the exhaust system. Coolant flows from the DEF injector, through the fuel heat exchanger, back to the coolant reservoir. Coolant flowing through the fuel heat exchanger transfers heat to and from fuel flowing from the fuel rail, through the fuel heat exchanger, to the fuel tank.

Under some circumstances, overheating of the DEF injector may cause localized vaporization of coolant and vapor-locking of the appurtenant systems. Vapor-locked systems may not necessarily be mitigated by increasing the coolant pump duty cycle, and ineffective cooling and/or potential damage to vehicle hardware can result. Provided herein are methods for identifying vaporized conditions of coolant, mitigating vaporization of coolant, and identifying low coolant conditions.

Figure 1:
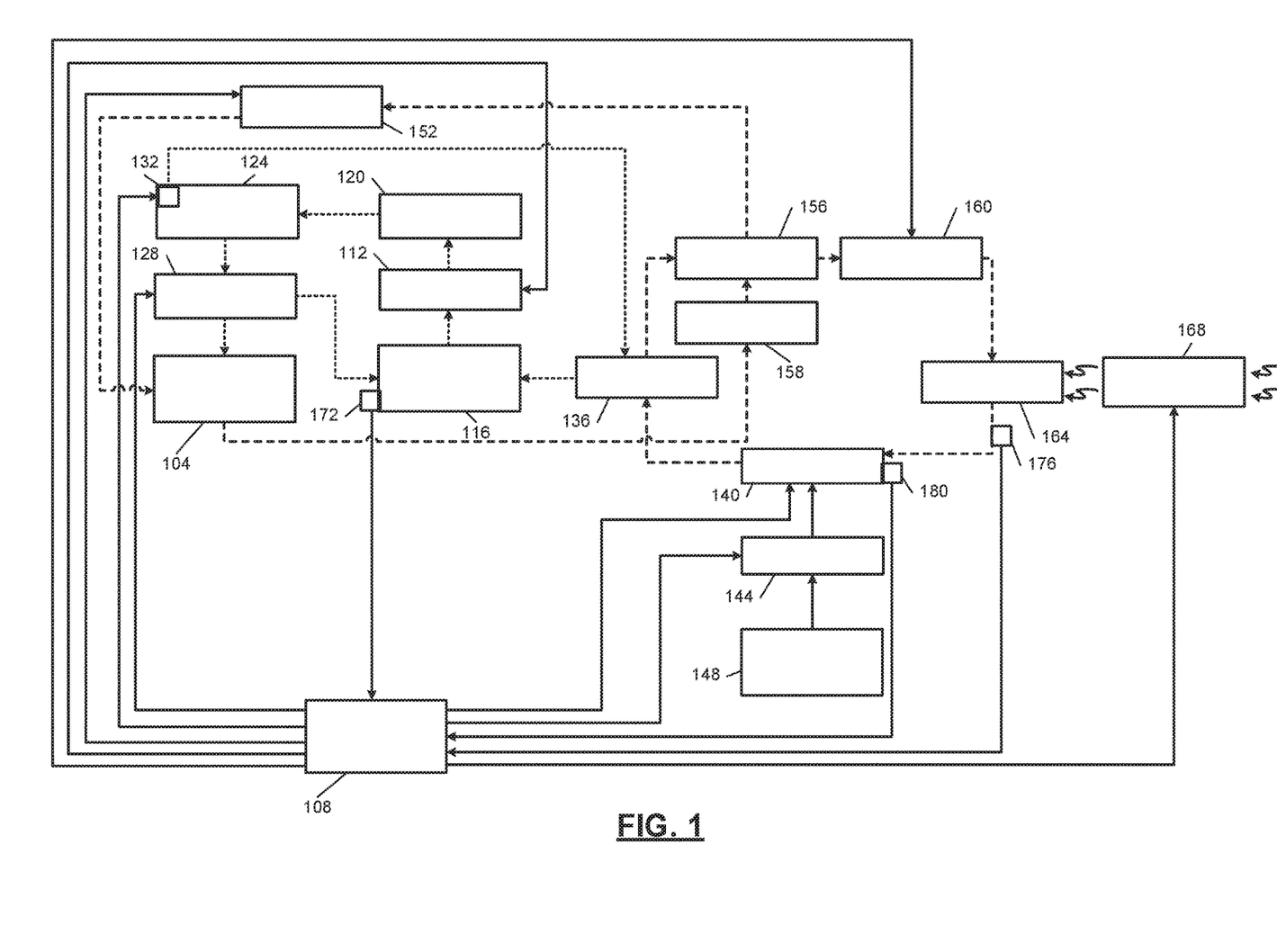
FIG. 1 is a functional block diagram illustrating a vehicle system including an engine system and a coolant system, according to one or more embodiments.

Referring now to FIG. 1, a functional block diagram of an example vehicle system including an engine system and a coolant circuit is presented. Solid lines in FIG. 1 are representative of electrical signals. Dashed lines are representative of coolant flow. Dotted lines are representative of fuel flow.

A vehicle includes one or more pumps configured to deliver diesel fuel from a fuel tank 116 to a fuel rail 124. For example, the vehicle includes a low pressure pump 112 that draws diesel fuel from the fuel tank 116 and pumps fuel to a high pressure pump 120 based on a first target pressure. The low pressure pump 112 may be an electric fuel pump. Alternatively, the low pressure pump 112 may be mechanically driven (e.g., by an engine 104). The low pressure pump 112 may be located inside or outside the fuel tank 116.

The high pressure pump 120 pumps to the fuel rail 124 based on a second target pressure that is greater than the first target pressure. The high pressure pump 120 may be mechanically driven (e.g., by the engine 104). Alternatively, the high pressure pump 120 may be an electric fuel pump.

Fuel injectors 128 are coupled to the fuel rail 124 and inject fuel from the fuel rail 124 directly into cylinders of the engine 104. For example, one or more fuel injectors may be provided per cylinder of the engine 104. Combustion of air and fuel within the cylinders generates drive torque. Combustion of air and fuel results in exhaust that is expelled from the cylinders to an exhaust system before being expelled to atmosphere.

A regulator valve 132 regulates fuel flow from the fuel rail 124 back to the fuel tank 116. More specifically, fuel flows from the fuel rail 124 to a fuel heat exchanger 136 and from the fuel heat exchanger 136 to the fuel tank 116. Generally, the fuel heat exchanger 136 transfers heat from fuel flowing through the fuel heat exchanger 136 to coolant flowing through the fuel heat exchanger 136 to cool fuel flowing back to the fuel tank 116.

Fuel may also flow from the fuel injectors 128 back to the fuel tank 116 under some circumstances. For example, a fuel injector opens when at least a predetermined power (e.g., voltage or current) is applied for a predetermined period to the fuel injectors 128. Fuel may flow from the fuel injector back to the fuel tank when the predetermined power is applied for a period less than the predetermined period to open the fuel injector.

The engine 104 combusts a mixture of air and fuel within cylinders to generate drive torque. The engine 104 outputs torque to a transmission. The transmission transfers torque to one or more wheels of a vehicle via a driveline (not shown). An engine control module (ECM) 108 may control one or more engine actuators to regulate the torque output of the engine 104, for example, based on a target torque output of the engine 104. Examples of engine actuators include, for example, the fuel injectors 128, a throttle valve, one or more turbochargers, intake and/or exhaust valve actuators, camshaft phasers, and other engine actuators.

A diesel exhaust fluid (DEF) injector 140 injects DEF (e.g., urea) into the exhaust system upstream of a catalyst, such as a selective catalytic reduction (SCR) catalyst. Ammonia from the DEF is stored by the catalyst. Ammonia reacts with Nitrogen Oxides (NOx) passing the catalyst, thereby reducing NOx output from the exhaust system.

A DEF pump 144 draws DEF from a DEF tank 148 and pumps DEF to the DEF injector 140. The DEF pump 144 may be an electric DEF pump. The ECM 108 may control the DEF pump 144, for example, based on a target pressure of DEF to the DEF injector 140.

Combustion of air and fuel within the engine 104 generates heat. The engine 104 includes a plurality of coolant channels through which engine coolant ("coolant") flows. For example, the engine 104 includes coolant channels through a (cylinder) head portion of the engine 104 and coolant channels through a block portion of the engine 104. The engine 104 may also include one or more other coolant channels through one or more other portions of the engine 104.

A first coolant pump 152 draws coolant from a coolant reservoir 156, such as a first portion of a coolant surge tank, and pumps coolant to the coolant channels of the engine 104. Coolant flowing through the engine 104 absorbs heat from the engine 104. Coolant flows from the engine 104 to a first radiator 158. The first radiator 158 transfers heat from coolant flowing through the first radiator 158 to air passing around and through the first radiator 158. The first coolant pump 152 pumps (cooled) coolant from the first radiator 158 to the engine 104. The first coolant pump 152 may be, for example, an electric coolant pump.

A second coolant pump 160 draws coolant from the coolant reservoir 156, such as a second portion of the coolant surge tank, and pumps coolant to a second radiator 164. The second coolant pump 160 may be an electric coolant pump. The second radiator 164 transfers heat from coolant passing through the second radiator 164 to air passing around and through the second radiator 164.

One or more fans may push air around and through the first radiator 158 and the second radiator 164 when the one or more fans are on. An aerodynamic shutter 168 regulates ambient airflow through a grille of the vehicle to the second radiator 164 and the first radiator 158. More specifically, the aerodynamic shutter 168 allows ambient airflow from the grille to the second radiator 164 and the first radiator 158 when the aerodynamic shutter 168 is open. The aerodynamic shutter 168 blocks ambient airflow through the grille to the second radiator 164 and the first radiator 158 when the aerodynamic shutter 168 is closed. While the example of one aerodynamic shutter is shown and discussed, the present application is also applicable to implementations including two or more aerodynamic shutters.

The DEF injector 140 receives coolant output from the second radiator 164. Operation of the DEF injector 140 generates heat. Heat from the DEF injector 140 may transfer to the coolant flowing through the DEF injector 140. Coolant flowing through or past the DEF injector 140 cools the DEF injector 140 and DEF within the DEF injector 140. Coolant flows from the DEF injector 140 to the fuel heat exchanger 136. The fuel heat exchanger 136 may also be referred to as a fuel cooler.

The fuel heat exchanger 136 transfers heat between coolant flowing through the fuel heat exchanger 136 and fuel flowing through the fuel heat exchanger 136. For example, coolant flowing through the fuel heat exchanger 136 may cool fuel flowing through the fuel heat exchanger 136 when the fuel flowing through the fuel heat exchanger 136 is hot. As another example, coolant flowing through the fuel heat exchanger 136 may warm fuel flowing through the fuel heat exchanger 136 to prevent fuel gelling when the fuel is cold. Coolant output from the fuel heat exchanger 136 may flow to the coolant reservoir 156 or the second coolant pump 160. In various implementations, fuel flowing from the fuel injectors 128 back to the fuel tank 116 may also flow through the fuel heat exchanger 136 en route to the fuel tank 116.

The coolant reservoir 156, the second coolant pump 160, the second radiator 164, the DEF injector 140, and the fuel heat exchanger 136 form a coolant circuit. The second coolant pump 160 controls a flow rate of coolant through the coolant circuit.

A fuel temperature sensor 172 measures a temperature of the fuel in the fuel tank 116. For example, the fuel temperature sensor 172 may be located between the fuel tank 116 and the high pressure pump 120. Alternatively, the fuel temperature sensor 172, for example, may be located within the fuel rail 124.

A coolant temperature sensor 176 measures a temperature of coolant output from the second radiator 164 (to the DEF injector 140). A DEF injector temperature sensor 180 may measure a temperature of the DEF injector 140. In various implementations, the temperature of the DEF injector 140 may be estimated by the ECM 108 based on one or more other parameters. One or more other sensors may also be implemented, such as an ambient temperature sensor, one or more engine temperature sensors, an aerodynamic shutter position sensor, and/or one or more other suitable vehicle sensors.

Figure 2:
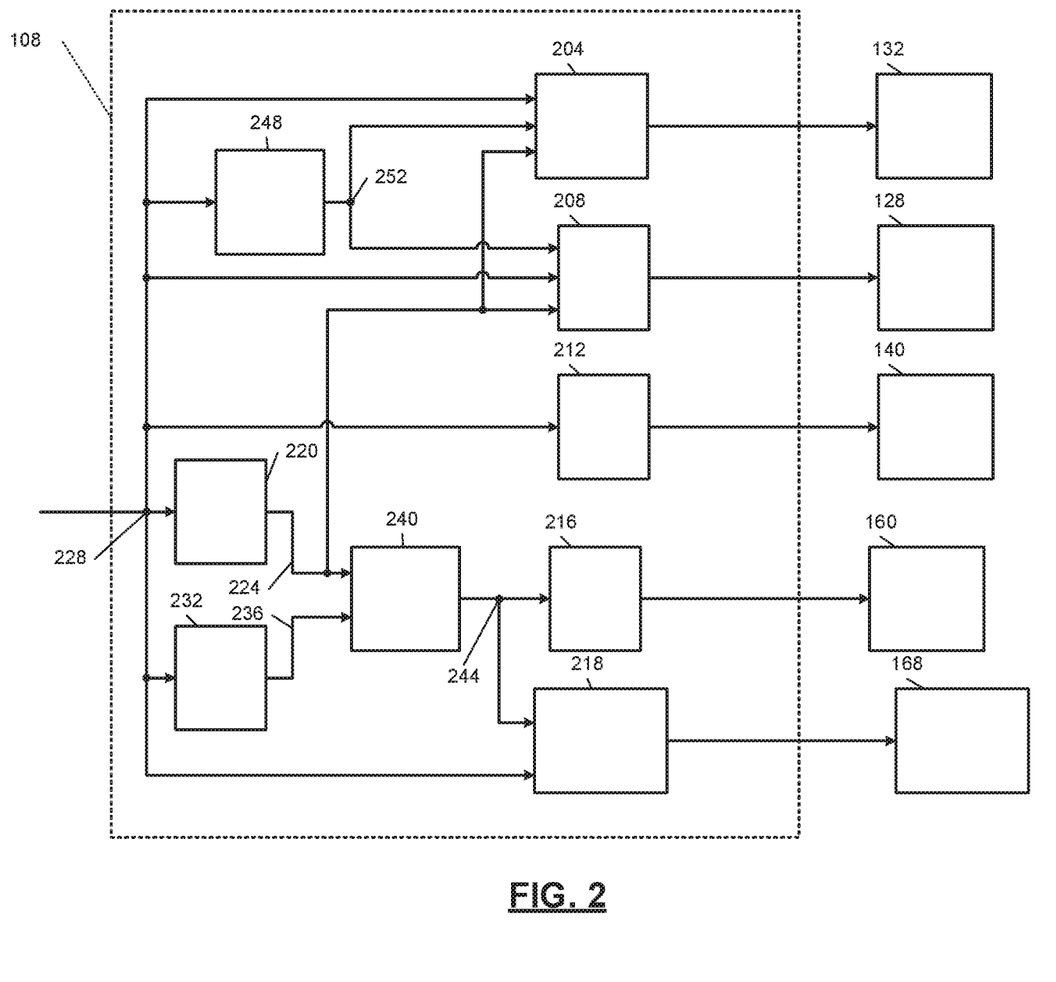
FIG. 2 is a functional block diagram illustrating an engine control module, according to one or more embodiments.

Referring now to FIG. 2, a functional block diagram of an example implementation of the ECM 108 is presented. A regulator control module 204 controls opening of the regulator valve 132. As discussed above, the regulator valve 132 controls fuel flow from the fuel rail 124 to the fuel tank 116.

A fuel control module 208 controls the fuel injectors 128 to control fuel injection by the fuel injectors 128 and fuel flow from the fuel injectors 128 back to the fuel tank 116. For example, the fuel control module 208 may apply a predetermined voltage to a fuel injector to open the fuel injector and inject fuel. The fuel control module 208 may not apply power to the fuel injector to close the fuel injector. The fuel control module 208 may apply a voltage for a period that is less than the predetermined period to open the fuel injector and greater than zero to cause the fuel injector to output fuel from the fuel rail 124 back to the fuel tank 116.

A DEF control module 212 controls DEF injection by the DEF injector 140. For example, the DEF control module 212 may apply a predetermined voltage to the DEF injector 140 to open the DEF injector 140. The DEF injector 140 injects DEF into the exhaust system when the DEF injector 140 is open. The DEF control module 212 may not apply power to the DEF injector 140 to close the DEF injector 140. The DEF control module 212 may generally control opening of the DEF injector 140 to achieve a target DEF flow rate into the exhaust system.

A coolant control module 216 controls operation and output (e.g., displacement and/or speed) of the second coolant pump 160. The coolant control module 216 may control application of power to the second coolant pump 160 to control operation and output of the second coolant pump 160. A shutter control module 218 controls a position of the aerodynamic shutter 168. The position may be a fully open position (e.g., 100 percent open), a fully closed position (e.g., 0 percent open), or a position between the fully open position and the fully closed position.

A first request module 220 determines a first requested speed 224 of the second coolant pump 160 based on one or more operating parameters 228, such as a temperature of the DEF injector 140. The first request module 220 determines the first requested speed 224 using a lookup table or an equation that relates DEF injector temperatures to first requested speeds of the second coolant pump 160. For example, the first request module 220 may increase the first requested speed 224 as the temperature of the DEF injector 140 increases and vice versa. The first requested speed 224 corresponds to a speed of the second coolant pump 160 for cooling of the DEF injector 140. Cooling of the DEF injector 140 may increase as the speed of the second coolant pump 160 increases and vice versa. The temperature of the DEF injector 140 may be measured, for example, using the DEF injector temperature sensor 180 or estimated based on one or more of the operating parameters 228.

A second request module 232 determines a second requested speed 236 of the second coolant pump 160 based on one or more of the operating parameters 228, such as a temperature of the fuel. The second request module 232 determines the second requested speed 236 using a lookup table or an equation that relates fuel temperatures to second requested speeds of the second coolant pump 160. For example, the second request module 232 may increase the second requested speed 236 as the fuel temperature increases and vice versa. The second requested speed 236 corresponds to a speed of the second coolant pump 160 for cooling of the fuel flowing to the fuel tank 116. Cooling of the fuel may increase as the speed of the second coolant pump 160 increases and vice versa. The fuel temperature may be measured, for example, using the fuel temperature sensor 172 or estimated based on one or more of the operating parameters 228. The coolant temperature may be measured, for example, using the coolant temperature sensor 176 or estimated based on one or more of the operating parameters 228.

A target module 240 determines a target speed 244 of the second coolant pump 160. For example, the target module 240 determines the target speed 244 based on the first and second requested speeds 224 and 236. For example, the target module 240 may set the target speed 244 based on or equal to the greater (maximum) one of the first and second requested speeds 224 and 236. The coolant control module 216 operates the second coolant pump 160 at the target speed 244.

In various implementations, the target module 240 may adjust the target speed 244 based on one or more of the operating parameters 228. For example, the target module 240 may determine a first correction value based on a fuel flow rate through the fuel heat exchanger 136, a fuel cooling effectiveness value, a DEF injection flow rate, and a DEF cooling effectiveness value. The target module 240 may determine the fuel cooling effectiveness value as a function of a coolant temperature within the coolant circuit and the fuel temperature. The target module 240 may determine the DEF cooling effectiveness value as a function of the DEF injector temperature and the coolant temperature. The target module 240 may determine the first correction value using one or more equations and/or lookup tables that relate fuel flow rates, fuel cooling effectiveness values, DEF injection flow rates, and DEF cooling effectiveness values to first correction values.

The first request module 220 may estimate the DEF injector temperature (e.g., at a tip of the DEF injector 140) based on the present value of the DEF injector temperature and the expected heat transfer to the DEF injector 140. Additionally or alternatively, the first request module 220 may determine an amount of change in DEF injection based on the expected heat transfer between the DEF injector 140 and the coolant circuit. The amount of change in DEF injection may increase as a change in the expected heat transfer between the DEF injector 140 and the coolant circuit increases and vice versa. When the amount of change in DEF injection is greater than a predetermined amount, the first request module 220 may adjust the first requested speed 224 based on the comparison of the DEF injector temperature and the vaporization temperature.

Figure 3:
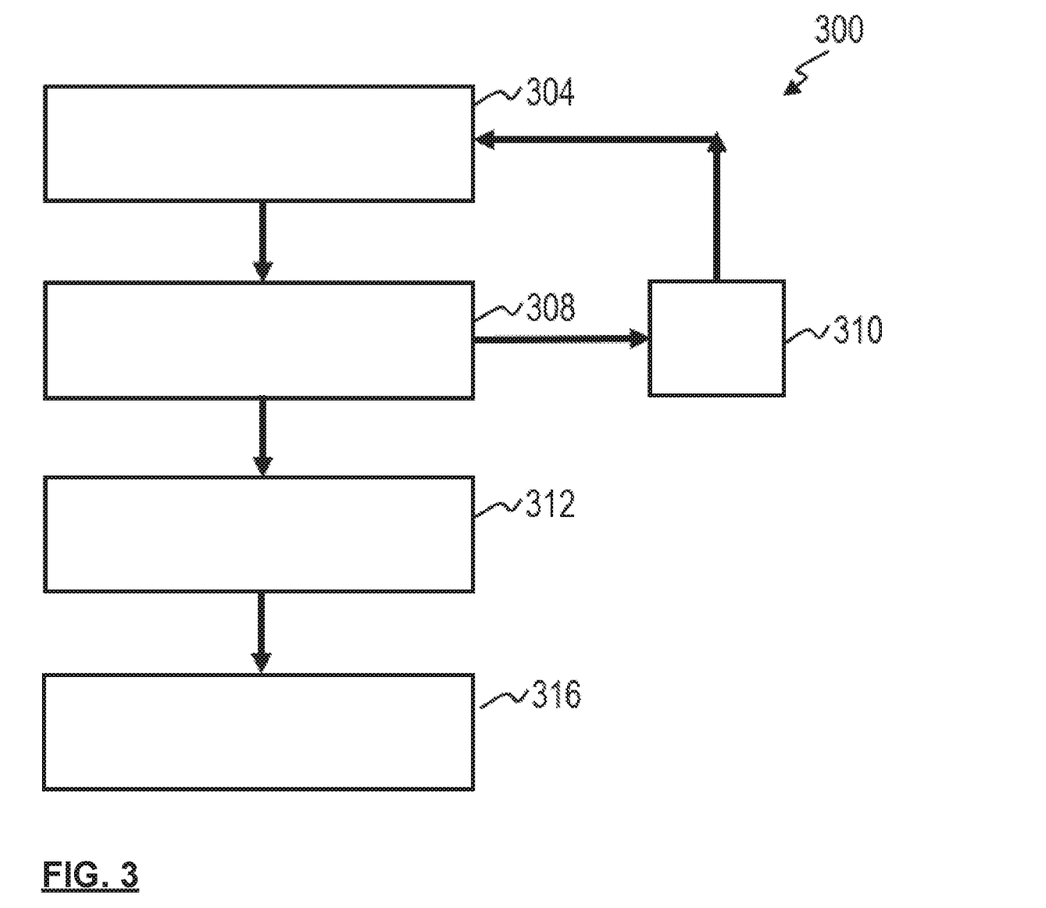
FIG. 3 is a flowchart illustrating a method for determining a vaporized condition of the coolant, according to one or more embodiments.

In certain vehicular operating scenarios, such as when a vehicle is operating under high loads or temporally proximate to an exhaust gas treatment system regeneration, the DEF injector 140 may vaporize coolant, and result in ineffective cooling and potential damage to vehicle hardware. FIG. 3 illustrates a flowchart of an example method 300 for determining a vaporized condition of the coolant. Particularly, method 300 can be implemented to determine a vaporized condition of the coolant proximate the DEF injector 140 based on the DEF injector 140 temperature. A first DEF injector temperature can be determined 304, and optionally a second DEF injector temperature can be determined 312. In some embodiments, a vaporized condition of the coolant can be determined 316 if the first temperature of the DEF injector 140 and the second temperature of the DEF injector 140 exceed a coolant vaporization temperature threshold. A coolant vaporization temperature threshold may be the vaporization temperature of the coolant, or a temperature below the vaporization temperature of the coolant (e.g., 95% of the vaporization temperature of the coolant).

In some embodiments, a vaporized condition of the coolant can be determined 316 if the first temperature of the DEF injector 140 and the second temperature of the DEF injector 140 exceed a coolant vaporization temperature threshold and the elapsed time between the measuring of the first temperature of the DEF injector 140 and the second temperature of the DEF injector 140 exceeds a coolant vaporization time threshold. The coolant vaporization time threshold can be a calibrated value, for example. In some embodiments many (i.e., more than two) DEF injector temperatures can be determined over a period of time. For example, in some embodiments, a vaporized condition of the coolant can be determined 316 if the average DEF injector 140 temperature over a period of time at least as long as the coolant vaporization time threshold exceeds a coolant vaporization temperature threshold.

After determining 304 the first DEF injector temperature, the method 300 can optionally further include determining 308 the duty cycle of the second coolant pump 160. The duty cycle of the second coolant pump 160 can be controlled based on the first DEF injector temperature. For example, if the first DEF injector temperature exceeds the coolant vaporization temperature threshold, and the duty cycle of the second coolant pump 160 is less than 100%, the duty cycle of the second coolant pump 160 can be increased 310. Subsequently, a first DEF injector temperature can be determined 304. Controlling the duty cycle of the second coolant pump 160 is effected by controlling the speed thereof, as described above.

Figure 4:
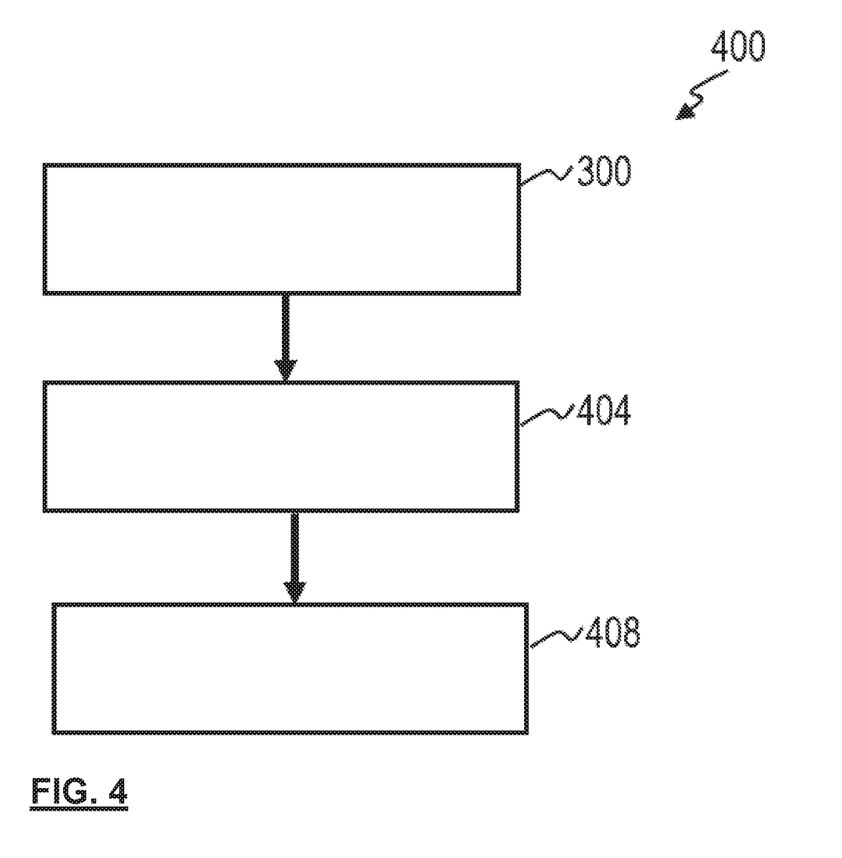
FIG. 4 is a flowchart illustrating a method for mitigating a vaporized condition of the coolant, according to one or more embodiments.

FIG. 4 illustrates a flowchart of an example method 400 for mitigating a vaporized condition of the coolant. Method 400 comprises, subsequent to determining a vaporized condition of the coolant based on the DEF injector 140 temperature (i.e., via method 300), oscillating 404 the duty cycle of the second coolant pump 160. Oscillating 404 the duty cycle of the second coolant pump 160 can be referred to as a vapor purge. Controlling the duty cycle of the second coolant pump 160 is effected by controlling the speed thereof, as described above. Oscillating 404 the duty cycle of the second coolant pump 160 can mitigate or eliminate the vaporized condition of the coolant. Method 400 can optionally further comprise, after oscillating 404 the duty cycle of the coolant pump, determine 408 a post-oscillating temperature of the DEF injector 140 and assess the presence or absence of a vaporized condition of the coolant based on the post-oscillating temperature of the DEF injector 140. Assessing the presence or absence of a vaporized condition of the coolant based on the post-oscillating temperature of the DEF injector 140 can be implemented using method 300, for example.

In one embodiment, oscillating 404 the duty cycle of the second coolant pump 160 can comprise oscillating between a maximum duty cycle and a minimum duty cycle of the coolant pump, for example. In another embodiment, oscillating 404 the duty cycle of the second coolant pump 160 can comprise oscillating between a relatively high duty cycle and a relatively low duty cycle of the coolant pump, and dwelling at each relatively high duty cycle and a relatively low duty cycle for a respective calibratable dwell time. The dwell time at the relatively high duty cycle can be equal to the dwell time at the relatively low duty cycle in some embodiments, or may be different in other embodiments. In some embodiments, oscillating 404 the duty cycle of the second coolant pump 160 can comprise oscillating between a relatively high duty cycle and a relatively low duty cycle of the coolant pump for a calibratable number of oscillating cycles. In some embodiments, oscillating 404 the duty cycle of the second coolant pump 160 can comprise oscillating between a relatively high duty cycle and a relatively low duty cycle of the coolant pump at a calibratable frequency.

Figure 5:
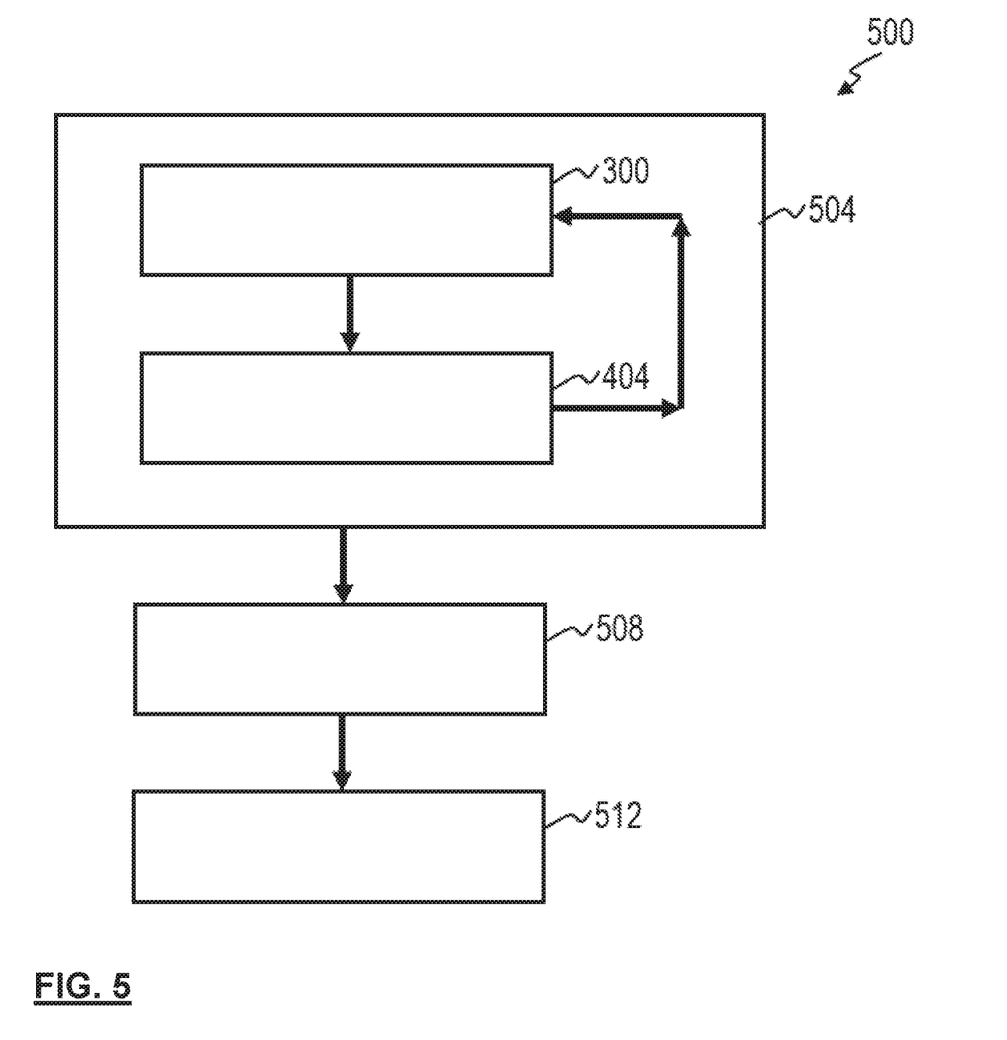
FIG. 5 is a flowchart illustrating a method for identifying a low-coolant condition of the coolant control system, according to one or more embodiments.

FIG. 5 illustrates a flowchart of an example method 500 for identifying a low-coolant condition of the coolant control system. Particularly, method 500 can be implemented to identify a low-coolant condition of the coolant control system based on the vapor purges implemented during a time period. Method 500 comprises iterating 504 (implementing method 300 and subsequently oscillating 404 the duty cycle of the second coolant pump 160) over a time period, and identifying 508 a low-coolant condition of the coolant control system based on the vapor purges implemented during the time period. Method 500 can further comprise, engaging 512 a low-coolant alarm appurtenant to the vehicle in response to identifying a low-coolant condition of the coolant control system. In one embodiment, a low-coolant condition of the coolant control system is identified 508 if the number of vapor purges implemented within the time period exceed a vapor purge count. In another embodiment, a low-coolant condition of the coolant control system is identified 508 if the collective duration of one or more vapor purges implemented within the time period exceeds a vapor purge duration threshold.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A coolant control system of a vehicle comprising:
   a coolant pump that pumps coolant to a second radiator that is different than a first radiator that receives coolant from an engine of the vehicle;
   a diesel exhaust fluid (DEF) injector that injects a DEF into an exhaust system of the vehicle and that receives coolant output from the second radiator;
   a fuel heat exchanger that receives fuel flowing from a fuel rail to a fuel tank of the vehicle, that receives coolant output from the DEF injector, and that transfers heat between coolant flowing through the fuel heat exchanger and fuel flowing through the fuel heat exchanger, wherein the coolant pump receives coolant output from the fuel heat exchanger; and
   an engine control module (ECM) configured to:
   determine a temperature of the DEF injector;
   determine a vaporized condition of the coolant based on the DEF injector temperature; and
   control the coolant pump based on the determined vaporized condition of the coolant.

2. The coolant control system of claim 1, wherein the ECM is configured to determine a first temperature of the DEF injector, determine a second temperature of the DEF injector, determine an elapsed time between the determination of the first temperature of the DEF injector and the determination of the second temperature of the DEF injector, and determine the vaporized condition of the coolant if the first temperature of the DEF injector and the second temperature of the DEF injector each exceed a coolant vaporization temperature threshold and the elapsed time exceeds a coolant vaporization time threshold.

3. The coolant control system of claim 1, wherein the ECM is configured to determine an average temperature of the DEF injector over a period of time at least as long as a coolant vaporization time threshold, and determine the vaporized condition of the coolant if the average temperature of the DEF injector exceeds a coolant vaporization temperature threshold.

4. The coolant control system of claim 1, wherein the ECM is configured to determine a duty cycle of the coolant pump and control a duty cycle of the coolant pump based on the determined DEF injector temperature.

5. The coolant control system of claim 1, wherein the ECM is further configured to determine a duty cycle of the coolant pump and increase the coolant pump duty cycle in response to a determined DEF injector temperature above a coolant vaporization temperature threshold.

6. A coolant control system of a vehicle comprising:
   a coolant pump that pumps coolant to a second radiator that is different than a first radiator that receives coolant from an engine of the vehicle;
   a diesel exhaust fluid (DEF) injector that injects a DEF into an exhaust system of the vehicle and that receives coolant output from the second radiator;
   a fuel heat exchanger that receives fuel flowing from a fuel rail to a fuel tank of the vehicle, that receives coolant output from the DEF injector, and that transfers heat between coolant flowing through the fuel heat exchanger and fuel flowing through the fuel heat exchanger, wherein the coolant pump receives coolant output from the fuel heat exchanger; and
   an engine control module (ECM) configured to: determine a temperature of the DEF injector;
   control a duty cycle of the coolant pump;
   determine a vaporized condition of the coolant based on the DEF injector temperature; and
   in response to determining the vaporized condition of the coolant, oscillate the duty cycle of the coolant pump.

7. The coolant control system of claim 6, wherein oscillating the duty cycle of the coolant pump mitigates the vaporized condition of the coolant.

8. The coolant control system of claim 6, wherein oscillating the duty cycle of the coolant pump comprises oscillating between a maximum duty cycle and a minimum duty cycle of the coolant pump.

9. The coolant control system of claim 6, wherein oscillating the duty cycle of the coolant pump comprises oscillating between a relatively high duty cycle and a relatively low duty cycle of the coolant pump, and dwelling at each relatively high duty cycle and a relatively low duty cycle for a respective calibratable dwell time.

10. The coolant control system of claim 6, wherein oscillating the duty cycle of the coolant pump comprises oscillating between a relatively high duty cycle and a relatively low duty cycle of the coolant pump for a calibratable number of oscillating cycles.

11. The coolant control system of claim 6, wherein oscillating the duty cycle of the coolant pump comprises oscillating between a relatively high duty cycle and a relatively low duty cycle of the coolant pump at a calibratable frequency.

12. The coolant control system of claim 6, wherein the ECM is further configured to, after oscillating the duty cycle of the coolant pump, determine a post-oscillating temperature of the DEF injector and assess a presence or absence of the vaporized condition of the coolant based on the post-oscillating temperature of the DEF injector.

13. A coolant control system of a vehicle comprising:
a coolant pump that pumps coolant to a second radiator that is different than a first radiator that receives coolant from an engine of the vehicle;
a diesel exhaust fluid (DEF) injector that injects a DEF into an exhaust system of the vehicle and that receives coolant output from the second radiator;
a fuel heat exchanger that receives fuel flowing from a fuel rail to a fuel tank of the vehicle, that receives coolant output from the DEF injector, and that transfers heat between coolant flowing through the fuel heat exchanger and fuel flowing through the fuel heat exchanger, wherein the coolant pump receives coolant output from the fuel heat exchanger; and
an engine control module (ECM) configured to:
determine a temperature of the DEF injector; control a duty cycle of the coolant pump;
iteratively:
determine a vaporized condition of the coolant based on the DEF injector temperature, and in response to determining the vaporized condition of the coolant, implement a vapor purge by oscillating the duty cycle of the coolant pump; and
identify a low-coolant condition of the coolant control system based on the vapor purges implemented during a time period.

14. The coolant control system of claim 13, wherein the ECM is configured to identify the low-coolant condition of the coolant control system if a number of vapor purges implemented within the time period exceed a vapor purge count.

15. The coolant control system of claim 13, wherein the ECM is configured to identify the low-coolant condition of the coolant control system if a collective duration of one or more vapor purges implemented within the time period exceeds a vapor purge duration threshold.

16. The coolant control system of claim 13, wherein the ECM is further configured to engage a low-coolant alarm appurtenant to the vehicle in response to identifying the low-coolant condition of the coolant control system.

* * * * *